US012657778B2

(12) United States Patent (10) Patent No.: US 12,657,778 B2
Unno et al. (45) Date of Patent: Jun. 16, 2026

(54) POINT CLOUD DECODING DEVICE, POINT CLOUD DECODING METHOD, AND PROGRAM

(71) Applicant: KDDI CORPORATION, Tokyo (JP)

(72) Inventors: Kyohei Unno, Fujimino (JP); Kei Kawamura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 398 days.

(21) Appl. No.: 18/212,184

(22) Filed: Jun. 21, 2023

(65) Prior Publication Data

US 2023/0334715 A1 Oct. 19, 2023

Related U.S. Application Data

(63) Continuation of application No. PCT/JP2021/044263, filed on Dec. 2, 2021.

(30) Foreign Application Priority Data

Dec. 25, 2020 (JP) ................................. 2020-217770

(51) Int. Cl.
*G06T 9/00* (2006.01)
*G06T 17/00* (2006.01)
(52) U.S. Cl.
CPC .............. *G06T 9/001* (2013.01); *G06T 17/00* (2013.01)
(58) Field of Classification Search
CPC .. G06T 9/001; G06T 9/00; G06T 9/40; G06T 17/00; H04N 19/46; H04N 19/597; H04N 19/90
See application file for complete search history.

(56) References Cited

U.S. PATENT DOCUMENTS

| | | | |
|---|---|---|---|
| 10,693,492 B1 * | 6/2020 | Lasserre ............. | H03M 7/6005 |
| 12,010,341 B2 | 6/2024 | Oh et al. | |
| 12,069,316 B2 * | 8/2024 | Oh ........................ | H04N 19/91 |

(Continued)

FOREIGN PATENT DOCUMENTS

| | | | | |
|---|---|---|---|---|
| CN | 111899162 A | * | 11/2020 | .............. G06T 9/00 |
| JP | 2017513305 A | | 5/2017 | |

(Continued)

OTHER PUBLICATIONS

Schwarz, Sebastian & Sheikhipour, Nahid & Sevom, Vida & Hannuksela, Miska. (2019). Video coding of dynamic 3D point cloud data. APSIPA Transactions on Signal and Information Processing. 8. 10.1017/ATSIP.2019.24. (Year: 2019).*

(Continued)

*Primary Examiner* — Chan S Park
*Assistant Examiner* — Paulo Andres Garcia
(74) *Attorney, Agent, or Firm* — Holtz, Holtz & Volek PC

(57) ABSTRACT

A point cloud decoding device 200 according to the present invention includes: an approximate-surface synthesizing unit 2030 configured to use presence of coordinates of each vertex only on an edge of a rectangle projected onto a plane, and give an index to each of the vertces on a basis of a coordinate value of each of the vertices, wherein the approximate-surface synthesizing unit 2030 sets a starting point on the edge of the rectangle prolected onto the plane, and gives the index to each of the vertices clockwise or counterclockwise from the starting point.

7 Claims, 10 Drawing Sheets

(56) References Cited

U.S. PATENT DOCUMENTS

| | | |
|---|---|---|
| 12,165,368 B2 | 12/2024 | Oh et al. |
| 2010/0239178 A1 | 9/2010 | Osher et al. |
| 2015/0070354 A1 | 3/2015 | Wu et al. |
| 2015/0382016 A1 | 12/2015 | Cohen et al. |
| 2018/0176587 A1 | 6/2018 | Panusopone et al. |
| 2019/0087978 A1 | 3/2019 | Tourapis et al. |
| 2020/0021844 A1 | 1/2020 | Yea et al. |
| 2020/0320744 A1 | 10/2020 | Nakagami et al. |
| 2021/0136414 A1* | 5/2021 | Oh ........................ H04N 19/597 |
| 2021/0297698 A1 | 9/2021 | Sugio et al. |
| 2021/0297699 A1 | 9/2021 | Iguchi et al. |
| 2021/0368186 A1 | 11/2021 | Sugio et al. |
| 2021/0383577 A1 | 12/2021 | Sugio et al. |
| 2021/0385500 A1* | 12/2021 | Zhang ..................... H04N 19/46 |
| 2022/0086444 A1 | 3/2022 | Piao et al. |
| 2022/0159310 A1 | 5/2022 | Oh et al. |
| 2022/0159312 A1 | 5/2022 | Oh et al. |
| 2022/0247997 A1 | 8/2022 | Abe et al. |
| 2022/0312036 A1 | 9/2022 | Sugio et al. |
| 2022/0394311 A1 | 12/2022 | Rosewarne |
| 2023/0353782 A1 | 11/2023 | Iguchi et al. |
| 2024/0298029 A1 | 9/2024 | Oh et al. |

FOREIGN PATENT DOCUMENTS

| | | | | |
|---|---|---|---|---|
| JP | 2018501549 A | * | 1/2018 | ............. G06T 19/20 |
| KR | 20030043638 A | * | 6/2003 | ........... G06T 15/405 |
| WO | 2014156707 A1 | | 10/2014 | |
| WO | 2019078000 A1 | | 4/2019 | |
| WO | 2020130134 A1 | | 6/2020 | |
| WO | 2020138353 A1 | | 7/2020 | |
| WO | 2020162495 A1 | | 8/2020 | |
| WO | 2020184443 A1 | | 9/2020 | |
| WO | 2021079951 A1 | | 4/2021 | |

OTHER PUBLICATIONS

Wulandhari, Lili & Wulandhari, Ayu & Haron, Habibollah. (2008). The evolution and trend of chain code scheme, https://www.researchgate.net/publication/228903655_The_evolution_and_trend_of_chain_code_scheme. (Year: 2008).*

P. de Oliveira Rente, C. Brites, J. Ascenso and F. Pereira, "Graph-Based Static 3D Point Clouds Geometry Coding," in IEEE Transactions on Multimedia, vol. 21, No. 2, pp. 284-299, Feb. 2019, doi: 10.1109/TMM.2018.2859591. (Year: 2019).*

S. Schwarz et al., "Emerging MPEG Standards for Point Cloud Compression," in IEEE Journal on Emerging and Selected Topics in Circuits and Systems, vol. 9, No. 1, pp. 133-148, Mar. 2019, doi: 10.1109/JETCAS.2018.2885981. (Year: 2019).*

M. Krivokua, P. A. Chou and M. Koroteev, "A Volumetric Approach to Point Cloud Compression Part II: Geometry Compression," in IEEE Transactions on Image Processing, vol. 29, pp. 2217-2229, 2020, doi: 10.1109/TIP.2019.2957853 (Year: 2020).*

J. Smith, G. Petrova, S. Schaefer, Progressive encoding and compression of surfaces generated from point cloud data, Computers & Graphics, vol. 36, Is. 5, 2012,p. 341-348, ISSN 0097-8493, https://doi.org/10.1016/j.cag.2012.03.032. (Year: 2012).*

K. Ainala, R. N. Mekuria, B. Khathariya, Z. Li, Y. Wang, R. Joshi, "An improved enhancement layer for octree based point cloud compression with plane projection approximation," Proc. SPIE 9971, Applications of Digital Image Processing XXXIX, 99710R, Sep. 27, 2016, https://doi.org/10.1117/12.2237753 (Year: 2016).*

M. Gopi and S. Krishnan, "A fast and efficient projection-based approach for surface reconstruction," Proceedings. XV Brazilian Symposium on Computer Graphics and Image Processing, Fortaleza, Brazil, 2002, pp. 179-186, doi: 10.1109/SIBGRA.2002.1167141. (Year: 2002).*

International Search Report (ISR) (and English language translation thereof) dated Dec. 21, 2021, issued in International Application No. PCT/JP2021/035553.

International Search Report (ISR) (and English language translation thereof) dated Jun. 29, 2021, issued in International Application No. PCT/JP2021/010068.

Related U.S. Appl. No. 18/118,866; First Named Inventor: Kyohei Unno; Title: "Point Cloud Decoding Device, Point Cloud Decoding Method, and Program"; filed Mar. 8, 2023.

Related U.S. Appl. No. 18/118,880; First Named Inventor: Kyohei Unno; Title: "Point Cloud Decoding Device, Point Cloud Decoding Method, and Program"; filed Mar. 8, 2023.

Related U.S. Appl. No. 18/118,951; First Named Inventor: Kyohei Unno; Title: "Point Cloud Decoding Device, Point Cloud Decoding Method, and Program"; filed Mar. 8, 2023.

Related U.S. Appl. No. 18/118,969; First Named Inventor: Kyohei Unno; Title: "Point Cloud Decoding Device, Point Cloud Decoding Method, and Program"; filed Mar. 8, 2023.

Written Opinion dated Dec. 21, 2021, issued in International Application No. PCT/JP2021/035553.

Written Opinion dated Jun. 29, 2021, issued in International Application No. PCT/JP2021/010068.

Helmrich, et al., "CE7-related: Joint chroma residual coding with multiple modes", Joint Video Experts Team (JVET) of ITU-T SG 16 WP3 and ISO/IEC JTC 1/SC 29/WG 11, JVET-No. 282-v3, pp. 1-10, 14th Meeting: Geneva, CH, Mar. 2019.

Written Opinion dated Dec. 21, 2021, issued in International Application No. PCT/JP2021/035549.

International Search Report (ISR) (and English language translation thereof) dated Dec. 21, 2021, issued in International Application No. PCT/JP2021/035549.

International Search Report (ISR) (and English language translation thereof) dated Dec. 21, 2021, issued in International Application No. PCT/JP2021/035551.

Japanese Office Action (and an English language translation thereof) dated May 28, 2024, issued in Japanese Application No. 2020-164129 (which is a counterpart of related U.S. Appl. No. 18/118,969).

Written Opinion dated Dec. 21, 2021, issued in International Application No. PCT/JP2021/035551.

Notice of Allowance dated Apr. 24, 2025, issued in related U.S. Appl. No. 18/118,880.

International Search Report (ISR) (and English translation thereof) dated Feb. 15, 2022, issued in International Application No. PCT/JP2021/044263.

Written Opinion dated Feb. 15, 2022, issued in International Application No. PCT/JP2021/044263.

"G-PCC Future Enhancements", ISO/IEC JTC 1/SC 29/WG 11; N19328.

Dricot, et al., "Adaptive Multi-level Triangle Soup for Geometry-based Point Cloud 1-7 Coding", 2019 IEEE 21st International Workshop on Multimedia Signal Processing (MMSP). Nov. 18, 2019; https://ieeexplore.ieee.org/document/8901791.

U.S. Appl. No. 18/118,866 First Named Inventor: Kyohei Unno; Title: "Point Cloud Decoding Device, Point Cloud Decoding Method, and Program"; filed Mar. 8, 2023.

U.S. Appl. No. 18/118,880, First Named Inventor: Kyohei Unno; Title: "Point Cloud Decoding Device, Point Cloud Decoding Method, and Program"; filed Mar. 8, 2023.

U.S. Appl. No. 18/118,951, First Named Inventor:Kyohei Unno; Title: "Point Cloud Decoding Device, Point Cloud Decoding Method, and Program"; filed Mar. 8, 2023.

U.S. Appl. No. 18/118,969, First Named Inventor: Kyohei Unno; Title: "Point Cloud Decoding Device, Point Cloud Decoding Method, and Program"; filed Mar. 8, 2023.

Office Action (Non-Final Rejection) dated May 8, 2025, issued in related U.S. Appl. No. 18/118,951.

Indian Office Action dated Aug. 7, 2025, issued in counterpart Indian Application No. 202317041865.

Office Action (Non-Final Rejection) dated Sep. 16, 2024, issued in related U.S. Appl. No. 18/118,866.

Office Action (Non-Final Rejection) dated May 15, 2025, issued in related U.S. Appl. No. 18/118,969.

U.S. Appl. No. 18/118,866, filed Mar. 8, 2023.

U.S. Appl. No. 18/118,880, filed Mar. 8, 2023.

U.S. Appl. No. 18/118,951, filed Mar. 8, 2023.

U.S. Appl. No. 18/118,969, filed Mar. 8, 2023.

(56)         References Cited

OTHER PUBLICATIONS

Office Action (Non-Final Rejection) dated Dec. 19, 2024, issued in
related U.S. Appl. No. 18/118,880.

* cited by examiner

FIG. 4B

POINT CLOUD DECODING DEVICE, POINT CLOUD DECODING METHOD, AND PROGRAM

CROSS-REFERENCE TO RELATED APPLICATIONS

The present application is a continuation of PCT Application No. PCT/JP2021/044263, filed on Dec. 2, 2021, which claims the benefit of Japanese patent application No. 2020-217770 filed on. Dec. 25, 2020, the entire contents of which are incorporated herein by reference in its entirety.

TECHNICAL FIELD

The present invention relates to a point cloud decoding device, a point cloud decoding method, and a program.

BACKGROUND ART

Non Patent Literature 1 discloses a technology in which arctangent approximate computing is used as a method for giving an index to each vertex in Trisoup.

CITATION LIST

Non Patent Literature

Non Patent Literature 1: G-PCC Future Enhancement, ISO/IEC/JTC1/SC29/WG11 N19328

SUMMARY OF INVENTION

Technical Problem

However, in the arctangent approximate computing disclosed in Non Patent Literature 1, arctangent fails to be accurately approximated, and there is a disadvantage in which a magnitude relationship of an output (an angle) relative to an input (a coordinate value) does not match a magnitude relationship in the case of use of an ideal arctangent.

Moreover, in Non Patent Literature 1, division processing is used in approximate computing, and there is a disadvantage in which the technology disclosed in Non Patent Literature 1 is not suitable for hardware implementation.

Thus, the present invention has been made in consideration of the disadvantages described above. An object of the present invention is to provide a point cloud decoding device, a point cloud decoding method, and a program that are capable of giving an index to each vertex according to a simple method in Trisoup.

Solution to Problem

A first aspect of the present invention is summarized as a point cloud decoding device including: an approximate-surface synthesizing unit configured to use presence of coordinates of each vertex only on an edge of a rectangle projected onto a plane, and give an index to each of the vertices on a basis of a coordinate value of each of the vertices, where the approximate-surface synthesizing unit sets a starting point on the edge of the rectangle projected onto the plane, and gives the index to each of the vertices clockwise or counterclockwise from the starting point.

A second aspect of the present invention is summarized as a point cloud decoding device including: an approximate-surface synthesizing unit configured to determine a projection plane, by using a maximum value and a minimum value of coordinates of respective vertices for each of an x-axis direction, a y-axis direction, and a z-axis direction.

A third aspect of the present invention is summarized as a point cloud decoding method including: a step of using presence of coordinates of each vertex on an edge of a rectangle projected onto a plane, and giving an index to each of the vertices on a basis of a coordinate value of each of the vertices, wherein in the step, a starting point is set on the edge of the rectangle projected. onto the plane, and the index is given to each of the vertices clockwise or counterclockwise from the starting point.

A fourth aspect of the present invention is summarized as a program that causes a computer to function as a point cloud decoding device, wherein the point cloud decoding device includes an approximate-surface synthesizing unit configured to use presence of coordinates of each vertex only on an edge of a rectangle projected onto a plane, and give an index to each of the vertices on a basis of a coordinate value of each of the vertices, and the approximate-surface synthesizing unit sets a starting point on the edge of the rectangle projected onto the plane, and gives the index to each of the vertices clockwise or counterclockwise from the starting point.

Advantageous Effects of Invention

According to the present invention, it is possible to provide a point cloud decoding device, a point cloud decoding method, and a program that are capable of giving an index to each vertex according to a simple method in Trisoup.

BRIEF DESCRIPTION OF DRAWINGS

FIG. 4B is a diagram for explaining an example of the processing performed by the approximate-surface synthesizing unit 2030 of the point cloud decoding device 200 according to the embodiment.

DESCRIPTION OF EMBODIMENTS

An embodiment of the present invention will be explained hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
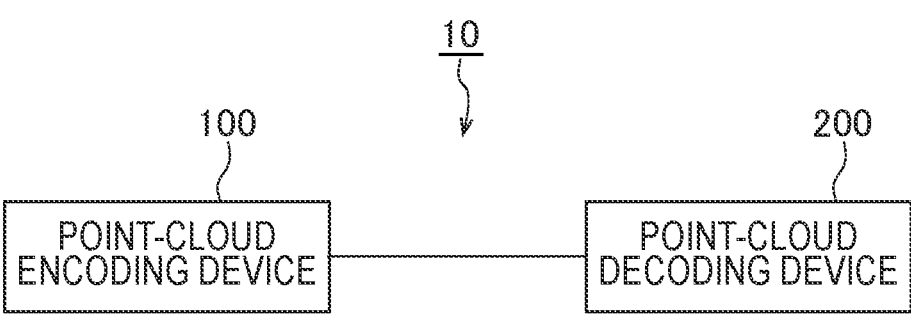
FIG. 1 is a diagram illustrating an example of a configuration of a point cloud processing system 10 according to an embodiment.

Hereinafter, with reference to FIG. 1 to FIG. 7, a point cloud processing system 10 according to a first embodiment of the present invention will be described. FIG. 1 is a diagram illustrating the point cloud processing system 10 according to an embodiment according to the present embodiment.

As illustrated in FIG. 1, the point cloud processing system 10 has a point cloud encoding device 100 and a point cloud decoding device 200.

The point cloud encoding device 100 is configured to generate encoded data (bit stream) by encoding input point cloud signals. The point cloud decoding device 200 is configured to generate output point cloud signals by decoding the bit stream.

Note that the input point cloud signals and the output point cloud signals include position information and attribute information of points in point clouds. The attribute information is, for example, color information or a reflection ratio of each point.

Herein, the bit stream may be transmitted from the point cloud encoding device 100 to the point cloud decoding device 200 via a transmission path. The bit stream may be stored in a storage medium and then provided from the point cloud encoding device 100 to the point cloud decoding device 200.

(Point Cloud Decoding Device 200)

Figure 2:
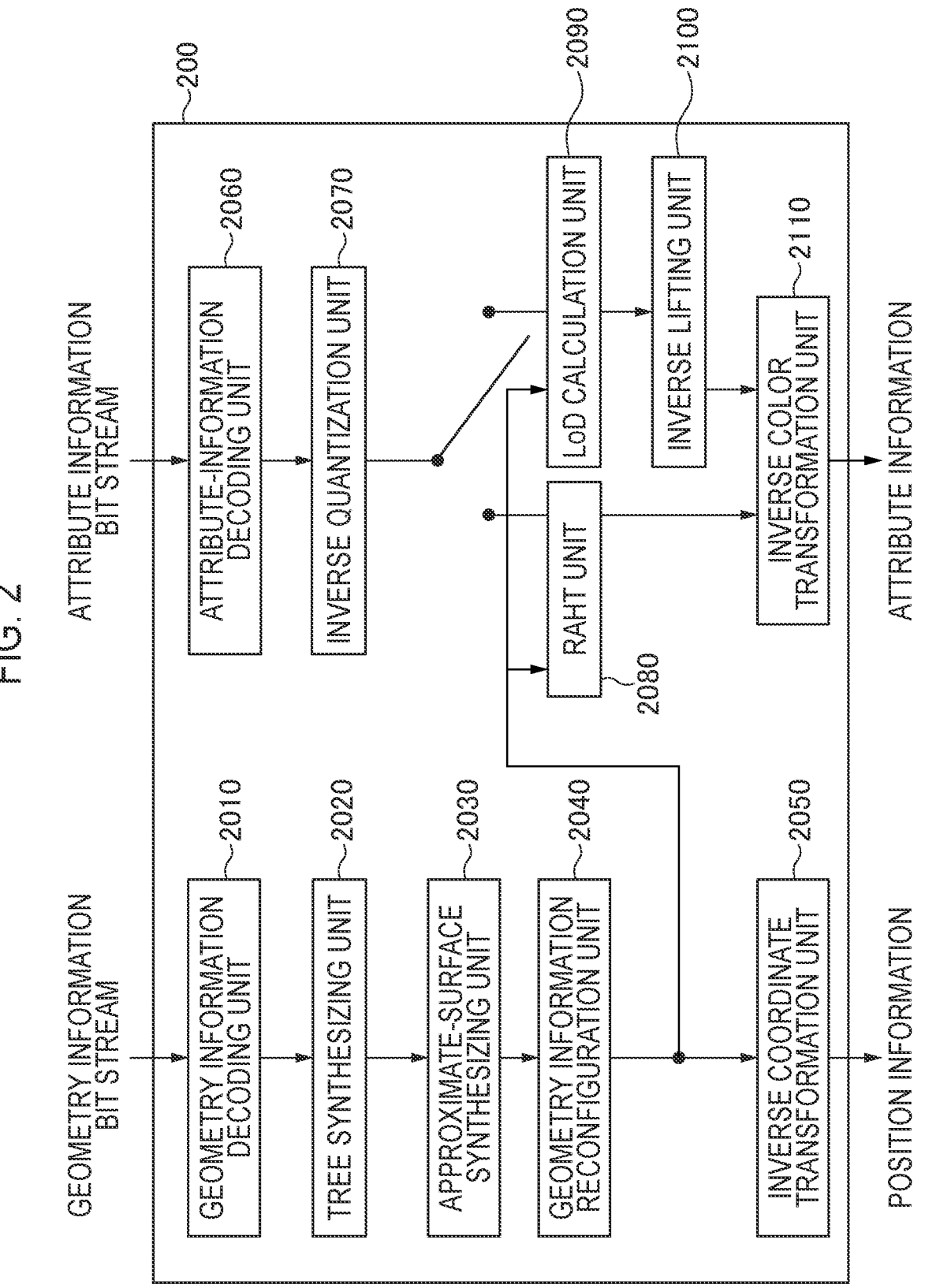
FIG. 2 is a diagram illustrating an example of functional blocks of a point cloud decoding device 200 according to the embodiment.

Hereinafter, with reference to FIG. 2, the point cloud decoding device 200 according to the present embodiment will be described. FIG. 2 is a diagram illustrating an example of functional blocks of the point cloud decoding device 200 according to the present embodiment.

As illustrated in FIG. 2, the point cloud decoding device 200 has a geometry information decoding unit 2010, a tree synthesizing unit 2020, an approximate-surface synthesizing unit 2030, a geometry information reconfiguration unit 2040, an inverse coordinate transformation unit 2050, an attribute-information decoding unit 2060, an inverse quantization unit 2070, a RAHT unit 2080, a LoD calculation unit 2090, an inverse lifting unit 2100, and an inverse color transformation unit 2110.

The geometry information decoding unit 2010 is configured to use, as input, a bit stream about geometry information (geometry information bit stream) among bit streams output from the point cloud encoding device 100 and to decode syntax.

A decoding process is, for example, a context-adaptive binary arithmetic decoding process. Herein, for example, the syntax includes control data (flags and parameters) for controlling the decoding process of the position information.

The tree synthesizing unit 2020 is configured to use, as input, control data, which has been decoded by the geometry information decoding unit 2010, and later-described occupancy code that shows on which nodes in a tree a point cloud is present and to generate tree information about in which regions in a decoding target space points are present.

The present process can generate the tree information by recursively repeating a process of sectioning the decoding target space by cuboids, determining whether the points are present in each cuboid by referencing the occupancy code, dividing the cuboid in which the points are present into plural cuboids, and referencing the occupancy code.

In the present embodiment, there can be used a method called "Octree" in which octree division is recursively carried out with the above described cuboids always as cubes and a method called "QtBt" in which quadtree division and binary tree division are carried out in addition to octree division. Whether or not "QtBt" is to be used is transmitted as the control data. from the point cloud encoding device 100 side.

Alternatively, in a case where the control data specifies that later-described Predicative coding is to be used, the tree synthesizing unit 2020 is configured to decode the coordinates of each point, based on a tree configuration determined in the point cloud encoding device 100.

The approximate-surface synthesizing unit 2030 is configured to generate approximate-surface information. using the tree information generated by the tree-information synthesizing unit 2020.

In a case where point clouds are densely distributed on a surface of an object, for example, when three-dimensional point cloud data of the object is to be decoded, the approximate-surface information approximates and expresses the region in which the point clouds are present by a small flat surface instead of decoding the individual point clouds.

Specifically, the approximate-surface synthesizing unit 2030 can generate e approximate-surface information, for example, by a method called "Trisoup". As specific processes of "Trisoup", for example, the methods described in Non Patent Literatures 1 and 2 can be used. When sparse point cloud data acquired by Lidar or the like is to be decoded, the present process can be omitted.

The geometry information reconfiguration unit 2040 is configured to reconfigure the geometry information of each point of the decoding-target point cloud (position information in a coordinate system assumed by the decoding process) based on the tree information generated by the tree-information synthesizing unit 2020 and the approximate-surface information generated by the approximate-surface synthesizing unit 2030.

The inverse coordinate transformation unit 2050 is configured to use the geometry information, which has been reconfigured by the geometry information reconfiguration unit 2040, as input, to transform the coordinate system assumed by the decoding process to a coordinate system of the output point cloud signals, and to output the position information.

The attribute-information decoding unit 2060 is configured to use, as input, a bit stream about the attribute information (attribute-information bit stream) among bit streams output from the point cloud encoding device 100 and to decode syntax.

A decoding process is, for example, a context-adaptive binary arithmetic decoding process. Herein, for example, the syntax includes control data (flags and parameters) for controlling the decoding process of the attribute information.

The attribute-information decoding unit 2060 is configured to decode quantized residual information from the decoded syntax.

The inverse quantization unit 2070 is configured to carry out an inverse quantization process and generate inverse-quantized residual information based on quantized residual information decoded by the attribute-information decoding unit 2060 and a quantization parameter which is part of the control data decoded by the attribute-information decoding unit 2060.

The inverse-quantized residual information is output to either one of the RAHT unit 2080 and LoD calculation unit 2090 depending on characteristics of the point cloud serving as a decoding target. The control data decoded by the attribute-information decoding unit 2060 specifies to which one the information is to be output.

The RAHT unit 2080 is configured to use, as input, the inverse-quantized residual information generated by the inverse-quantized residual information and the geometry information generated by the geometry information reconfiguration unit 2040 and to decode the attribute information of each point by using one type of Haar transformation (in a decoding process, inverse Haar transformation) called Region Adaptive Hierarchical Transform (RAHT). As specific processes of RAHT, for example, the methods described in Non Patent Literatures 1 and 2 can be used.

The LoD calculation unit 2090 is configured to use the geometry information, which has been generated by the geometry information reconfiguration unit 2040, as input and to generate Level of Detail (LoD).

LoD is the information for defining a reference relation (referencing point and point to be referenced) for realizing prediction encoding which predicts, from the attribute information of a certain point, the attribute information of another point and encodes or decodes prediction residual.

In other words, LoD is the information defining a hierarchical structure which categorizes the points included in the geometry information into plural levels and encodes or decodes the attributes of the point belonging to a lower level by using the attribute information of the point which belongs to a higher level.

As specific methods of determining LoD, for example, the methods described in Non Patent Literatures 1 and 2 may be used. Other examples will be described later.

The inverse lifting unit 2100 is configured to decode the attribute information of each point based on the hierarchical structure defined by LoD by using the LoD generated by the LoD calculation unit 2090 and the inverse-quantized residual information generated by the inverse-quantized residual information. As specific processes of the inverse lifting, for example, the methods described in Non Patent Literatures 1 and 2 can be used.

The inverse color transformation unit 2110 is configured to subject the attribute information, which is output from the RAHT unit 2080 or the inverse lifting unit 2100, to an inverse color transformation process when the attribute information of the decoding target is color information and when color transformation has been carried out on the point cloud encoding device 100 side. Whether to execute the inverse color transformation process or not is determined by the control data decoded by the attribute-information decoding unit 2060.

The point cloud decoding device 200 is configured to decode and output the attribute information of each point in the point cloud by the above described processes.

(Approximate-Surface Synthesizing Unit 2030)

An example of processing performed by the approximate-surface synthesizing unit 2030 according to the present embodiment will be described below with reference to FIGS. 3 to 5.

The tree synthesizing unit 2020 is configured to divide a cuboid into pieces having a predetermined size, prior to the processing performed by the approximate-surface synthesizing unit 2030. Hereinafter, this cuboid is referred to as a node.

The predetermined size can be determined, for example, on a side of the point cloud encoding device 100, and can be transmitted as control information to a side of the point cloud decoding device 200. The side of the point cloud decoding device 200 performs processing to be performed by the tree synthesizing unit 2020 until each node has the predetermined size, and then performs, for example, the processing described below on each of the nodes.

An example of the processing performed by the approximate-surface synthesizing unit 2030 will be described below with reference to FIG. 3.

Figure 3:
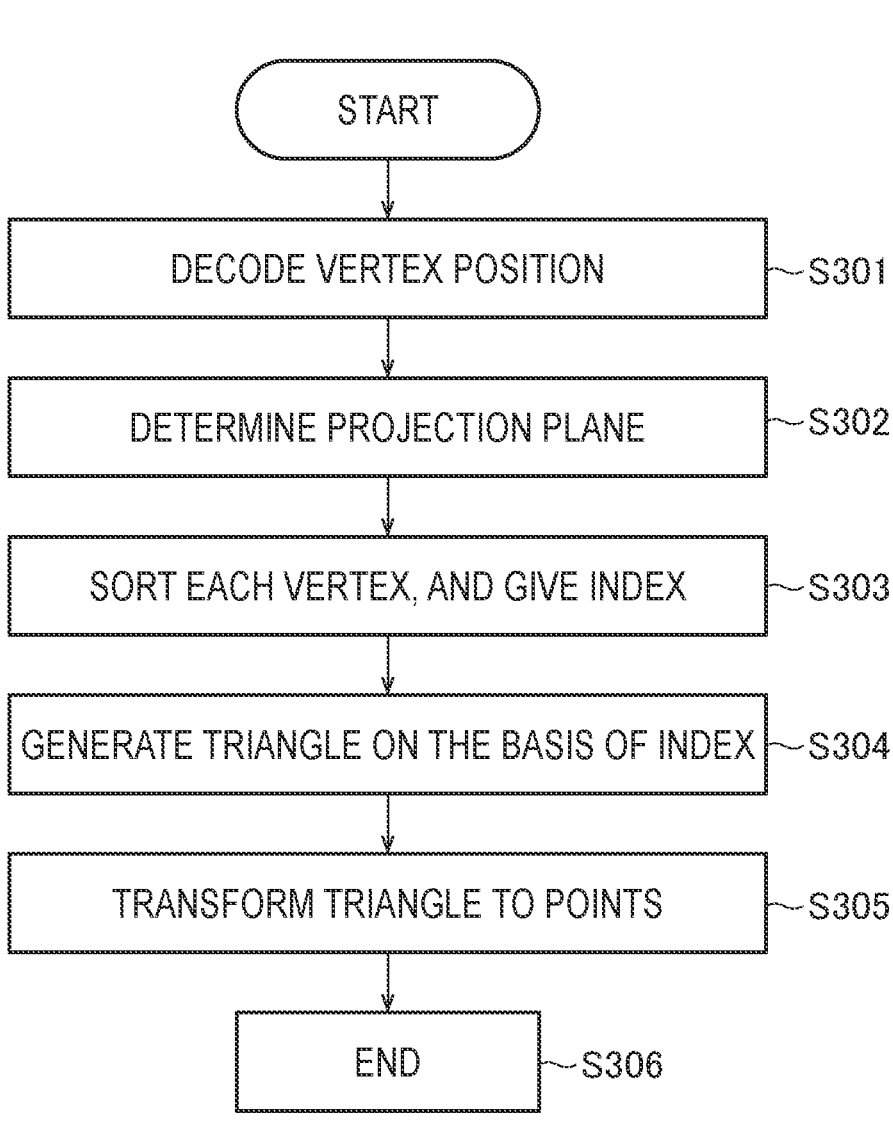
FIG. 3 is a flowchart illustrating an. example of processing performed by an approximate-surface synthesizing unit 2030 of the point cloud decoding device 200 according to the embodiment.

As illustrated in FIG. 3, in step S301, the approximate-surface synthesizing unit 2030 decodes a vertex position in each node.

Figure 4A:
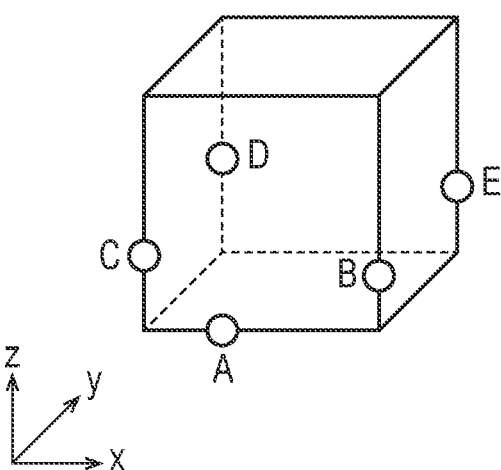
FIG. 4A is a diagram for explaining an example of the processing performed by the approximate-surface synthesizing unit 2030 of the point cloud decoding device 200 according to the embodiment.

As illustrated in FIG. 4A, vertex positions A to F are only present on edges of a cuboid (including the case of a cube).

Here, a single vertex can be present on each edge. Stated another way, 12 vertices at maximum are decoded in each of the nodes.

FIG. 4A illustrates an example of a case where five vertices have been decoded. As a method for decoding a vertex positon, for example, the method described in Non Patent Literature 1 can be applied.

In step S302, the approximate-surface synthesizing unit 2030 determines a projection plane.

Here, the approximate-surface synthesizing unit 2030 determines the projection plane by using a maximum value and a minimum value of each of x-axis direction coordinates, y-axis direction coordinates, and z-axis direction coordinates of respective vertices.

For example, as described in Non Patent Literature 1, the approximate-surface synthesizing unit 2030 may calculate distributions in an x-axis direction, a y-axis direction, and a z-axis direction of coordinates of the respective vertices, and may determine the projection plane in such a way that degenerating is performed in an axis direction having a smallest distribution.

Stated another way, in a case where distribution is smallest in the z-axis direction, the approximate-surface synthesizing unit 2030 may perform degenerating in the z-axis direction, and may determine an x-y plane as the projection plane.

Furthermore, in a case where distribution. is smallest in the y-axis direction, the approximate-surface synthesizing unit 2030 may perform degenerating in the y-axis direction, and may determine an x-z plane as the projection plane.

Moreover, in a case where distribution is smallest in the x-axis direction, the approximate-surface synthesizing unit 2030 may perform degenerating in the x-axis direction, and may determine a y-z plane as the projection plane.

Alternatively, the approximate-surface synthesizing unit 2030 may calculate a difference value between a maximum value and a minimum value of coordinates of the respective vertices for each of the x-axis direction, the y-axis direction, and the z-axis direction, may perform degenerating in an axis direction having a smallest difference value, and may determine, as the projection plane, a plane formed by two residual axis directions.

Figure 4B:
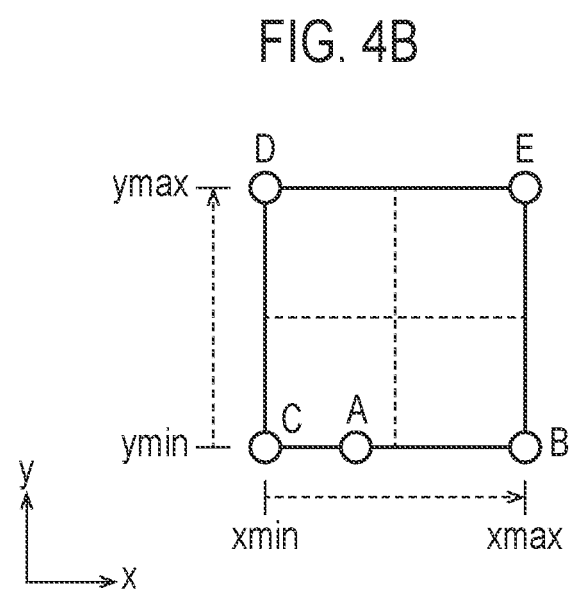
Figure 4C:
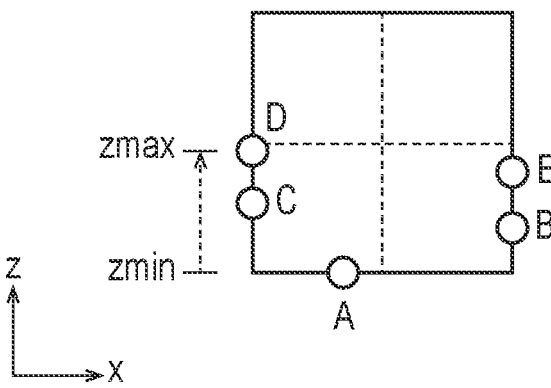
FIG. 4C is a diagram for explaining an example of the processing performed by the approximate-surface synthesizing unit 2030 of the point cloud decoding device 200 according to the embodiment.

FIG. 4B illustrates a case where vertices A to E of FIG. 4A have been projected onto the x-y plane, and FIG. 4C illustrates a case where vertices A to E of FIG. 4A have been projected onto the x-z plane.

Here, a minimum value and a maximum value of coordinates of the x-axis direction respectively correspond to xmin and xmax in FIG. 4B, a minimum value and a maximum value of coordinates of the y-axis direction respectively correspond to ymin and ymax in FIG. 4B, and a minimum value and a maximum value of coordinates of the z-axis direction respectively correspond to zmin and zmax in FIG. 4C.

The approximate-surface synthesizing unit 2030 calculates the difference value described above between the maximum value and the minimum value (for example, in the case of the x-axis direction, xmax−xmin) for each of the axis directions, and performs degenerating in an. axis direction having a smallest difference value.

For example, in the example of FIG. 4, a difference value (zmax−zmin) for the z-axis direction is smallest, and therefore the approximate-surface synthesizing unit 2030 can perform degenerating in the z-axis direction, and can determine the x-y plane as the projection plane.

As described above, the approximate-surface synthesizing unit 2030 is configured to perform degenerating in an axis direction having a smallest difference between a maximum value and a minimum value of coordinates of respective vertices from among the x-axis direction, the y-axis direction, and the z-axis direction, and determine, as the projection plane, a plane formed by two residual axis directions.

By employing the configuration described above, an operation amount can be reduced in. comparison. with a case where the projection plane is determined by using distribution. In the case of implementation using software, processing time can be reduced, and in the case of implementation using hardware, circuit scale and power consumption can be reduced.

In step S303, the approximate-surface synthesizing unit 2030 sorts the respective vertices, and gives an index to the respective vertices. An example of the process of step S303 will be described with reference to FIGS. 5 to 6.

Figure 5A:
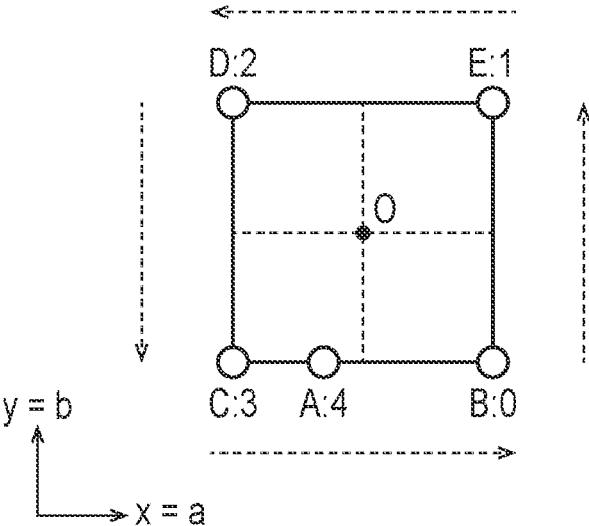
FIG. 5A is a diagram for explaining an example of the processing performed by the approximate-surface synthesizing unit 2030 of the point cloud decoding device 200 according to the embodiment.

FIG. 5A illustrates an example of a case where the approximate-surface synthesizing unit 2030 has performed degenerating in the z-axis direction, and has projected the vertices onto the x-y plane, in the example illustrated in FIG. 4 of vertex positions. Hereinafter, description will be provided under the assumption that an x-axis is an a-axis and a y-axis is a b-axis.

In a case where degenerating has been performed in the y-axis direction, it is assumed that the x-axis is the a-axis and a z-axis is the b-axis, and in a case where degenerating has been performed in the x-axis direction, it is assumed that the y-axis is the a-axis and the z-axis is the b-axis. The processing described below can be applied to respective cases.

Furthermore, in the description below, as illustrated in FIG. 5A, it is assumed that coordinates of the respective vertices A to E are expressed as coordinates in a case where a center of a rectangle projected onto an a-b plane is the origin O. The description below is provided by using, as an example, a case where it is assumed that a square serving as one type of a rectangle is the projection plane. However, the rectangle can be coped with according to a method similar to the method described below, by appropriately considering the lengths of edges.

Figure 6:
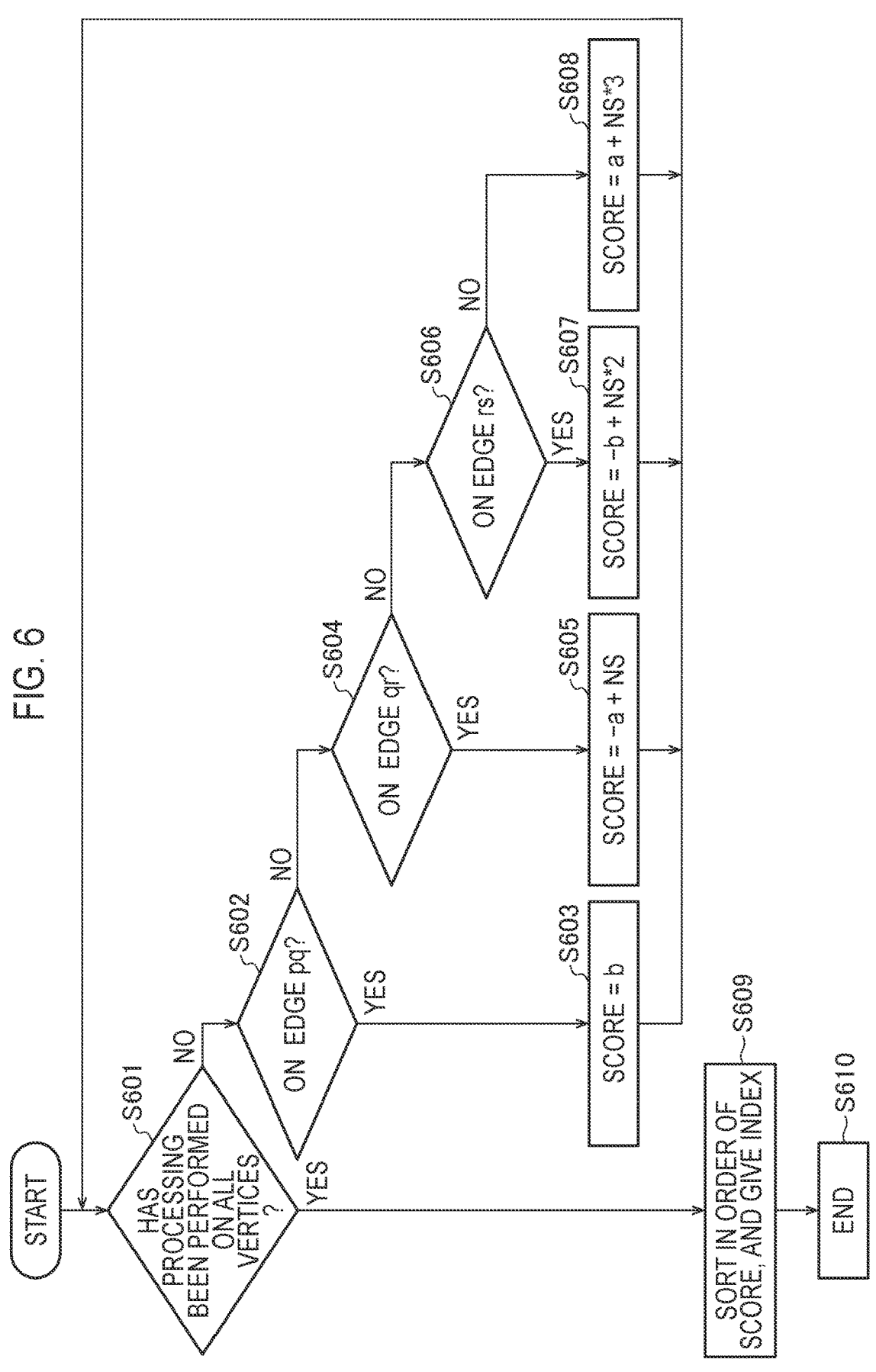
FIG. 6 is a diagram for explaining an example of the processing performed by the approximate-surface synthesizing unit 2030 of the point cloud decoding device 200 according to the embodiment.

FIG. 6 is a flowchart illustrating an example of a procedure of sorting the respective vertices and giving an index in step S303.

As illustrated in FIG. 6, in step S303, the approximate-surface synthesizing unit 2030 determines whether or not the score described below has been calculated for all of the vertices of a corresponding node.

In a case where the score has been calculated for all of the vertices, the present procedure moves on to step S609; otherwise, the present procedure moves on to step S602.

Figure 5B:
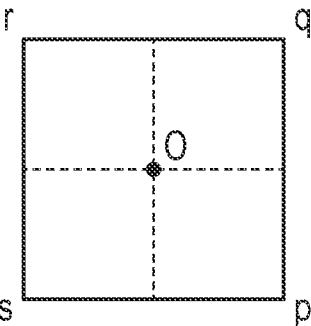
FIG. 5B is a diagram for explaining an example of the processing performed by the approximate-surface synthesizing unit 2030 of the point cloud decoding device 200 according to the embodiment.

In step S602, the approximate-surface synthesizing unit 2030 determines whether or not a currently processed vertex is present on an edge pq in FIG. 5B. Whether or not the currently processed vertex is present on the edge pq can be determined according to, for example, whether or not an a-coordinate of the vertex is half of the node size (hereinafter referred to as NS), that is, whether or not the a-coordinate is NS/2. Here, the node size is the length of one edge of a square in FIGS. 5A and 5B.

In a case where it has been determined that the vertex is present on the edge pq, the present procedure moves on to step S603; otherwise, the present procedure moves on to step S604.

In step S603, the approximate-surface synthesizing unit 2030 calculates a score of the vertex. For example, in a case where the vertex is present on the edge pq, the approximate-surface synthesizing unit 2030 uses, as the score, a b-coordinate of the vertex with no change.

After the score has been calculated in step S603, the present procedure moves on no step S601, and the approximate-surface synthesizing unit 2030 performs processing on the next vertex.

In step S604, the approximate-surface synthesizing. unit 2030 determines whether or not a currently processed vertex is present on an edge qr in FIG. 5B. Whether or not the currently processed vertex is present on the edge qr can be determined according to, for example, whether or not the b-coordinate of the vertex is half of NS, that is, whether or not the b-coordinate is NS/2.

In a case where it has been determined that the vertex is present on the edge qr, the present procedure moves on to step S605; otherwise, the present procedure moves on to step S606.

In step S605, the approximate-surface synthesizing unit 2030 calculates a score of the vertex. For example, in a case where the vertex is present on the edge qr, the approximate-surface synthesizing unit 2030 determines that score=−a+ NS, by using the a-coordinate of the vertex.

After the score has been calculated in step S605, the present procedure moves on to step S601, and the approximate-surface synthesizing unit 2030 performs processing on the next vertex.

In step S606, the approximate-surface synthesizing unit 2030 determines whether or not a currently processed vertex is present on an edge rs in FIG. 5B. Whether or not the currently processed vertex is present on the edge rs can be determined according to, for example, whether or not the a-coordinate of the vertex is half of NS, that is, whether or not the a-coordinate is NS/2.

In a case where it has been determined that the vertex is present on the edge rs, the present procedure moves on to step S607; otherwise, the present procedure moves on to step S608.

In step S607, the approximate-surface synthesizing unit 2030 calculates a score of the vertex. For example, in a case where the vertex is present on the edge rs, the approximate-surface synthesizing unit 2030 determines that score=−b+NS*2 (where * indicates multiplication), by using the b-coordinate of the vertex.

After the score has been calculated in step S607, the present procedure moves on to step S601, and the approximate-surface synthesizing unit 2030 performs processing on the next vertex.

In step S608, the approximate-surface synthesizing. unit 2030 calculates a score of the vertex. For example, in a case where the vertex is present on an edge sp in FIG. 5B, the approximate-surface synthesizing unit 2030 determines that score=a+NS*3 (where * indicates multiplication), by using the a-coordinate of the vertex.

After the score has been calculated in step S608, the present procedure moves on to step S601, and the approximate-surface synthesizing unit 2030 performs processing on the next vertex.

In step S609, the approximate-surface synthesizing unit 2030 sorts the respective vertices in the ascending order of the scores (in the example described above, values of −NS/2 to NS*7/2 are obtained) of the respective vertices, and gives an index to the respective vertices in the ascending order of the score.

Then, the present procedure moves on to step S610, and the processing is terminated.

In the example described above, a score value of each of the vertices may be negative, but, for example, it may be defined that NS/2 is added to the entirety to always obtain a non-negative value (for example, 0 to 4*NS).

Furthermore, in the example described above, description has been provided by using, as an example, a case where a coordinate value is expressed by fractional precision. However, the present invention is not limited to such a case, and in a case where the coordinate value is expressed by an integer value, processing equivalent to the example described above of fractional precision can be achieved by appropriately adding an offset (+1 or −1) for correcting an error caused by division.

Furthermore, the approximate-surface synthesizing unit 2030 may take a quantization error in a case where an integer arithmetic operation is performed into consideration, and may determine whether or not a point is present on an edge by using, for the edge rq and the edge pq, whether or not a coordinate of the point is greater than or equal to half of the node size (NS/2 or more), and by using, for the edge rs, whether a coordinate of the point is less than or equal to half of the node size (NS/2 or less). Note that the approximate-surface synthesizing unit 2030 may perform determination by using another method, if the approximate-surface synthesizing unit 2030 can accurately determine that a point is present on an edge on the basis of a coordinate value.

In the procedure described above, an index is given to respective vertices in counterclockwise order from a lower right vertex of a projected rectangle, as illustrated in FIG. 5A. Note that "B:0" in FIG. 5A means that an index of vertex B is "0", and the similar is applied to the other vertices.

In the example described above, an index has been given to the respective vertices in counterclockwise order with a lower right porton of the rectangle in FIG. 5A as a starting point. However, it is sufficient if the starting point has been clearly determined, and the starting point may be different from the lower right portion. Stated another way, the starting point may be present in any portion on an edge of the rectangle.

Furthermore, a single starting point may be determined prior to decoding processing performed by the geometry information decoding unit, or a position of the starting point may be adaptively changed for each node. For example, the starting point may be determined in such a way that an index is finally given on an edge including a largest number of vertices.

In the examples of FIGS. 5A and 5B, the edge sp includes a largest number of vertices, and therefore in a case where an index is given to respective vertices in counterclockwise order, a position of vertex p can be determined as the starting point.

Furthermore, the approximate-surface synthesizing unit 2030 may give an index to respective vertices in clockwise order from the starting point, in contrast to counterclockwise order.

In any case, in setting the starting point on an edge of a projected rectangle, and determining an order of giving an index to respective vertices, the approximate-surface synthesizing unit 2030 may use a method other than the above, if the approximate-surface synthesizing unit 2030 is configured to use a feature in which a vertex is always present on an edge of the rectangle, and give an index to respective vertices clockwise or counterclockwise on the basis of a coordinate value.

As described above, the approximate-surface synthesizing unit 2030 may be configured to add an index to a vertex on an edge in a vertical direction, by using a coordinate value on a vertical direction axis.

Similarly, the approximate-surface synthesizing unit 2030 may be configured to give an index to a vertex on an edge in a horizontal direction, by using a coordinate value on a horizontal direction axis.

Furthermore, the approximate-surface synthesizing unit 2030 may be configured to set a starting point on an edge of a rectangle projected onto a plane, and give an index to respective vertices clockwise or counterclockwise from the starting point.

By employing the configuration described above, distribution of points can be appropriately generated on a plane defined by a triangle in combination with the process of step S304 in a rear stage. In contrast, in the method of Non Patent Literature 1, arctangent approximation is not accurately performed, and an index is not given to respective vertices in clockwise or counterclockwise order. Therefore, distribution of points fails to be appropriately generated.

Moreover, in the method of Non Patent Literature 1, division is performed in arctangent approximate computing. However, processing according to the present embodiment can be achieved by only basically performing addition and subtraction (an offset value such as N-S/2 can be handled as a constant by calculating the offset value in advance according to NS of Trisoup). Thus, according the present embodiment, in particular, the number of processing cycles can be reduced in the case of implementation using hardware, in comparison with the method of Non Patent Literature 1.

As described above, after respective vertices have been sorted, and an index has been given, the present processing moves on to step S304 of FIG. 3.

In step S304, the approximate-surface synthesizing unit 2030 generates a triangle on the basis of the indices of the respective vertices that have been given in step S303.

Figure 7:
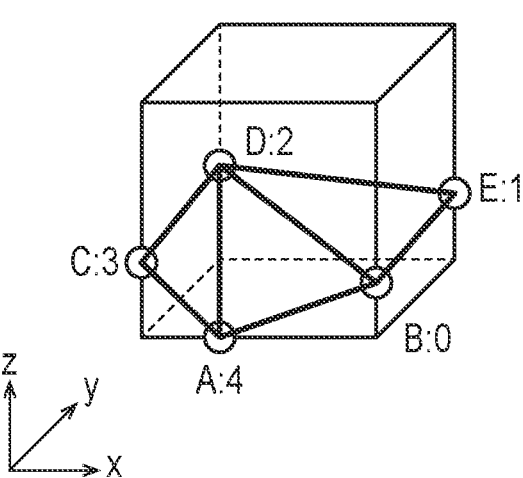
FIG. 7 is a diagram for explaining an example of the processing performed by the approximate-surface synthesizing unit 2030 of the point cloud decoding device 200 according to the embodiment.

For example, as illustrated in FIG. 5A, in the case of five vertices, the approximate-surface synthesizing unit 2030 can generate three triangles, as illustrated in FIG. 7.

Such triangle generation can be achieved, for example, by defining, in advance, a combination of indices of vertices for forming a triangle, as described in Non Patent Literature 1.

FIG. 7 illustrates an example of a case where it has been defined in advance that, for example, in the case of five vertices, each triangle is generated by using three points for which a combination of indices of vertices for forming a triangle is {0, 1, 2}, {0, 2, 4}, or {2, 3, 4}.

After the triangles have been generated as described above, the present processing moves on to step S305.

In step S305, the approximate-surface synthesizing unit 2030 generals points on the basis of the triangles generated in step S304. As a method for generating the points from the triangles, for example, the method described in Non Patent Literature 1 can be applied.

After points have been generated for all of the nodes in the procedure described above, the processing moves on to step S306, and the processing is terminated.

Further, the point cloud encoding device 100 and the point cloud decoding device 200 may be realized as a program causing a computer to execute each function (each step).

Note that the above described embodiments have been described by taking application of the present invention to the point cloud encoding device 10 and the point cloud decoding device 30 as examples. However, the present invention is not limited only thereto, but can be similarly applied to an encoding/decoding system having functions of the encoding device 10 and the decoding device 30.

INDUSTRIAL APPLICABILITY

According to the present embodiment, it is possible to improve the overall quality of service in video communications, thereby contributing to Goal 9 of the UN-led Sustainable Development Goals (SDGs) which is to "build resilient infrastructure, promote inclusive and sustainable industrialization and foster innovation".

What is claimed is:

1. A point cloud decoding device comprising a circuit, wherein the decoding device is configured to decode a bit stream by generating output point cloud signals, wherein the circuit is configured to, as part of decoding the bit stream, generate approximate-surface information that approximates and expresses a region in which point clouds are present by a flat surface, and wherein the circuit is configured to, when generating the approximate-surface information:

using presence of coordinates of each vertex only on an edge of a rectangle projected onto a plane, give an index to each of the vertices based on a coordinate value of each of the vertices, set a starting point on the edge of the rectangle projected onto the plane, and give the index to each of the vertices clockwise or counterclockwise from the starting point, and reconstruct a triangle based on the indices of the respective vertices and generate points on a plane defined by the triangle.

2. The point cloud decoding device according to claim 1, wherein the circuit is further configured to:

give the index to a vertex on an edge in a vertical direction of the rectangle, by using a coordinate value on a vertical direction axis; and give the index to a vertex on an edge in a horizontal direction of the rectangle, by using a coordinate value on a horizontal direction axis.

3. The point cloud decoding device according to claim 1, wherein the circuit is further configured to set the starting point prior to decoding processing performed by a geometry information decoding unit.

4. The point cloud decoding device according to claim 1, wherein the circuit is further configured to determine the plane onto which the rectangle is projected, by using a maximum value and a minimum value of coordinates of the respective vertices for each of an x-axis direction, a y-axis direction, and a z-axis direction.

5. The point cloud decoding device according to claim 4, wherein the circuit is further configured to perform degenerating in an axis direction having a smallest difference between the maximum value and the minimum value of the coordinates of the respective vertices from among the x-axis direction, the y-axis direction, and the z-axis direction, and determine, as the plane, a plane formed by two residual axis directions.

6. A point cloud decoding method comprising:

decoding a bit stream by generating output point cloud signals; and as part of decoding the bit stream, generating approximate-surface information that approximates and expresses a region in which point clouds are present by a flat surface, wherein generating the approximate-surface information includes:

using presence of coordinates of each vertex on an edge of a rectangle projected onto a plane, and giving an index to each of the vertices based on a coordinate value of each of the vertices, setting a starting point on the edge of the rectangle projected onto the plane, and giving the index to each of the vertices clockwise or counterclockwise from the starting point, and reconstructing a triangle based on the indices of the respective vertices and generate points on a plane defined by the triangle.

7. A program stored on a non-transitory computer-readable medium that causes a computer to function as a point cloud decoding device, the program being executable by the computer to perform functions including:

decoding a bit stream by generating output point cloud signals; and as part of decoding the bit stream, generating approximate-surface information that approximates and expresses a region in which point clouds are present by a flat surface, wherein generating the approximate-surface information includes:

using presence of coordinates of each vertex only on an edge of a rectangle projected onto a plane, and giving an index to each of the vertices based on a coordinate value of each of the vertices, setting a starting point on the edge of the rectangle projected onto the plane, and giving the index to each of the vertices clockwise or counterclockwise from the starting point, and reconstructing a triangle based on the indices of the respective vertices and generate points on a plane defined by the triangle.

* * * * *